United States Patent
Beatty et al.

(10) Patent No.: US 10,915,897 B2
(45) Date of Patent: Feb. 9, 2021

(54) TOKEN MANAGEMENT FOR ENHANCED OMNI-CHANNEL PAYMENTS EXPERIENCE AND ANALYTICS

(71) Applicant: Clover Network, Inc., Sunnyvale, CA (US)

(72) Inventors: John Daniel Beatty, Emerald Hills, CA (US); Brian Jeremiah Murray, Mountain View, CA (US); Nilendu Misra, Menlo Park, CA (US); Nicholas Posner, Redwood City, CA (US)

(73) Assignee: Clover Network, Inc., Sunnyvale, CA (US)

( * ) Notice: Subject to any disclaimer, the term of this patent is extended or adjusted under 35 U.S.C. 154(b) by 178 days.

(21) Appl. No.: 16/007,945

(22) Filed: Jun. 13, 2018

(65) Prior Publication Data

US 2019/0385159 A1    Dec. 19, 2019

(51) Int. Cl.
G06Q 20/38    (2012.01)
G06Q 20/20    (2012.01)

(52) U.S. Cl.
CPC .......... G06Q 20/385 (2013.01); G06Q 20/20 (2013.01); *G06Q 2220/00* (2013.01)

(58) Field of Classification Search
None
See application file for complete search history.

(56) References Cited

U.S. PATENT DOCUMENTS 5,230,069 A     7/1993  Brelsford
6,327,578 B1 * 12/2001  Linehan ................. G06Q 20/02
                                                  705/65
9,483,693 B1 * 11/2016  de Menezes Pereira ...................
                                                  G06Q 20/405

(Continued)

FOREIGN PATENT DOCUMENTS

CA       2981665 A1 *  4/2019  ......... G06Q 20/3223
WO    2012170303 A1    12/2012

OTHER PUBLICATIONS

Jun Liu, R. J. (Mar. 7, 2015). Competition, cooperation, and regulation: Understanding the evolution. Electronic Commerce Research and Applications 14 (2015) 372-391. Singapore (Year: 2015).*

(Continued)

*Primary Examiner* — El Mehdi Oussir
(74) *Attorney, Agent, or Firm* — Daylight Law, P.C.

(57) ABSTRACT

Methods and systems related to the use of tokenization services in payment processing systems are disclosed. The methods and systems include token translation services, token maps used as the basis for customer data models, specific approaches for securing the token maps and associated data, and the efficient storage of the token maps and associated data to facilitate enhanced payments experiences and analytics. One method includes transmitting a tokenization request with an encrypted payment account number from a POS to a tokenization service, receiving a token from the tokenization service in response to the tokenization request, salting the token with data to produce a salted token, (Continued)

encrypting the salted token using a secure processor on the POS, mapping the encrypted salted token to the payment account number in a map, and storing the map and the encrypted salted token in a memory on the secure processor on the POS.

15 Claims, 5 Drawing Sheets

(56) References Cited

U.S. PATENT DOCUMENTS

| | | | |
|---|---|---|---|
| 2005/0102188 A1* | 5/2005 | Hutchison | G06Q 30/0601 705/39 |
| 2007/0226785 A1 | 9/2007 | Chow | |
| 2008/0046715 A1 | 2/2008 | Balazs | |
| 2009/0048953 A1* | 2/2009 | Hazel | G07F 7/1008 705/35 |
| 2010/0100924 A1 | 4/2010 | Hinton | |
| 2010/0257612 A1* | 10/2010 | McGuire | G06Q 20/383 726/26 |
| 2012/0027013 A1 | 2/2012 | Napierala | |
| 2012/0317036 A1 | 12/2012 | Bower | |
| 2013/0191289 A1* | 7/2013 | Cronic | G06Q 20/4014 705/67 |
| 2014/0032419 A1 | 1/2014 | Anderson | |
| 2014/0096226 A1* | 4/2014 | Barkan | G06F 21/57 726/11 |
| 2014/0164241 A1* | 6/2014 | Neuwirth | G06Q 20/12 705/44 |
| 2015/0095174 A1* | 4/2015 | Dua | G06Q 20/20 705/21 |
| 2015/0112870 A1 | 4/2015 | Nagasundaram | |
| 2016/0005029 A1* | 1/2016 | Ivey | G06Q 20/409 705/44 |
| 2016/0012465 A1* | 1/2016 | Sharp | G06Q 20/384 705/14.17 |
| 2016/0140542 A1 | 5/2016 | Hammad | |
| 2016/0253651 A1* | 9/2016 | Park | G07F 9/023 705/39 |
| 2016/0260096 A1 | 9/2016 | Lacoss-Arnold et al. | |
| 2017/0103387 A1 | 4/2017 | Weber | |
| 2017/0237730 A1 | 8/2017 | Reilly | |
| 2018/0158052 A1* | 6/2018 | Tseretopoulos | G06Q 20/3829 |
| 2020/0143379 A1* | 5/2020 | Lowenberg | G06Q 20/4016 |

OTHER PUBLICATIONS

First Data Corporation, How Multi-Pay Tokens Can Reduce Security Risks and the PCI Compliance Burden for eCommerce Merchants, 2012, Available at: https://www.firstdata.com/downloads/thought-leadership/MultipayTokensWP.pdf, (Accessed on: Mar. 27, 2018).

Extended European Search Report dated Nov. 25, 2019 from European Patent Application No. 19179998.0, 8 pages.

* cited by examiner

FIG. 5
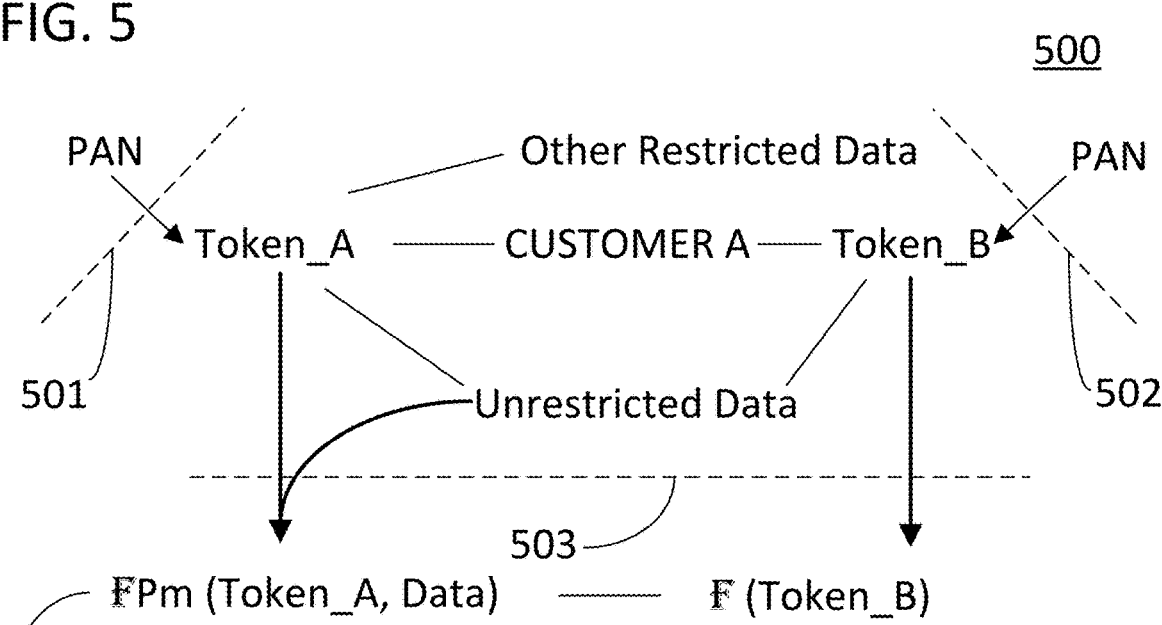
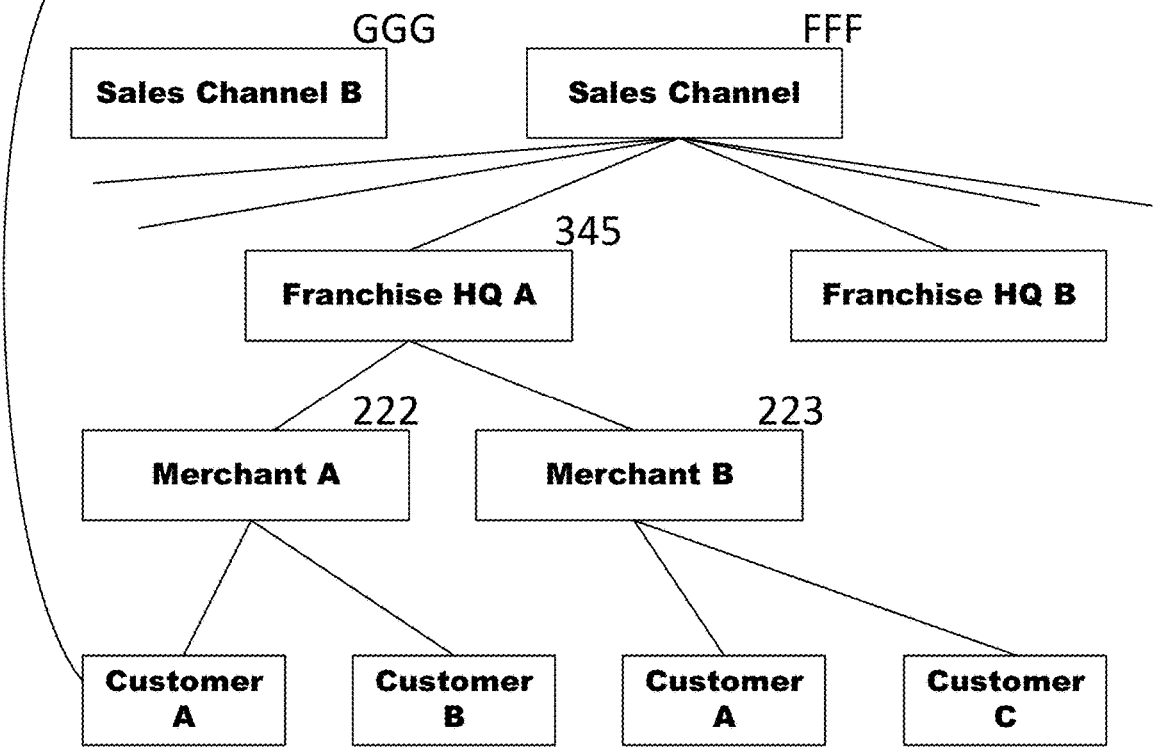

TOKEN MANAGEMENT FOR ENHANCED OMNI-CHANNEL PAYMENTS EXPERIENCE AND ANALYTICS

BACKGROUND

Networks and devices that handle payment information are required to comply with strict industry standards to maintain the security of that information. For example, payment card industry (PCI) standards place strict restrictions on the storage of credit or debit card account numbers. As such, merchants utilize specially designed point of sale (POS) systems for securely handling payment account numbers, and POS system designers ensure that POS systems can participate in a payment flow without needing to store those account numbers in unencrypted format in unsecure or lower security environments for any appreciable amount of time. To this end, POS systems are generally designed to receive an account number, encrypt the number, send the encrypted data along with transaction reference information to a payment processor to authorize a payment, and receive an authorization message indicating status of the payment request (usually an approval or decline) with the transaction reference information to match the response to the originating transaction. The unencrypted cardholder account number is usually not returned in full plain text back to the POS system where the transaction originated.

In situations where a POS system needs to utilize the account number at a later time, the POS system will generally utilize a tokenization service to obtain a token for use as a proxy for that account number. Tokenization services are network accessible systems often run by specialized entities that interact with the institutions that authorize payments. Tokenization services provide a network service in which a token is provided in exchange for a payment account number. Unlike the payment account number, the token can be stored in lower security environments without putting customer account information at risk of theft, or running afoul of industry standards such as the PCI standards. Examples of situations where the payment account may need to be referenced by the POS system after a transaction has occurred include recurring payments, chargebacks, and "chatty transactions" that require multiple transmissions of a single payment account number before an authorization is received. In these situations, tokens can be used in place of the payment account number.

FIG. 1 illustrates a POS system in the form of a POS terminal 100 communicating with both a tokenization service 101 and a payment processor 102 to authorize a transaction. The POS terminal also stores a token in a local memory 103 on POS terminal 100 for later use. In the illustrated case, a payment card 104 provides an account number "1234" to POS terminal 100 to authorize a payment for goods or services at POS terminal 100. If POS terminal 100 utilizes tokenization, the account number is then encrypted and sent through a network to tokenization service 101 in the form of an encrypted payment account number 105. The encrypted payment account number 105 is then decrypted and tokenized at tokenization service 101. The exact method by which the token is generated can vary. In certain approaches, cryptographic techniques are used to generate the token using the account number as an input to a cryptographic algorithm. In other approaches, the token is a fully randomized string of digits that is stored in association with the account number at the tokenization service 101 so that there is no chance of attackers deriving the account number from the token. In the illustrated case, token 106 with string "56%^&78" was generated by tokenization service 101 as a proxy for account number "1234."

POS terminal 100 will receive token 106 from tokenization service 101. Upon receipt of token 106, POS terminal 100 can store that encrypted token in a secure memory 103 on POS terminal 100. POS terminal 100 can also transmit the token to payment processor 102. The token can be encrypted for transmission to payment processor 102. Payment processor 102, using a private network connection 107 to tokenization service 101, will be able to access the account number "1234" using token 106. The payment processor can then authorize the transaction and return a payment authorization 108 to POS terminal 100.

Tokens, such as token 106, can take on various characteristics and provide additional functionality besides serving as a proxy for an account number. For example, the tokens can be generated and managed such that they can only be used to authorize transactions during a limited time, for a limited number of transactions such as single-use or multiple-use, or at a limited number of POS systems. The temporal duration or number of uses can be configurable by a merchant that utilizes the tokenization service. Tokens also differ in terms of their reversibility. Some tokens are generated using an algorithmic process such that, given enough processing power and time, one could determine the original account number from the token without additional data. Some tokens are generated using non-algorithmic process generated data combined with the original card data in a way that cannot be reverse engineered by typical brute force computing methods. The tokens can also differ in terms of the algorithm or process used to generate the tokens. The tokens can be generated via a cryptographic, non-cryptographic, or non-mathematical (e.g., random) process. In particular, the ANS X9.119 standard provides cryptographic approaches that can be used in accordance with this disclosure to generate the tokens. However, numerous other cryptographic approaches that are not included in ANS X9.119 can be used to cryptographically generate the tokens in accordance with this disclosure. The number of potential functionalities leads to the availability of numerous formats for tokens. The variance in token formats is also increased by the fact that there are multiple token service providers offering tokenization services.

Specific examples of tokens include Multi-pay (MP) tokens and Financial (F) tokens offered by the Frist Data TransArmor tokenization service. MP-tokens can be used for multiple authorizations but only with respect to a single merchant's payment authorizations. Multi-pay tokens, such as MP-tokens, are generally unique to a merchant and are mapped with the customer payment card. As a result, if they are stolen they will be valueless in any other merchant environment. The tokens are constrained to be used only within the Cardholder Data Environment (CDE). Multi-pay tokens are useful with e-commerce or "Card Not Present" (CNP)/Omnichannel merchants. Most "Payments API" systems in the industry use MP-like tokens. MP-tokens allow merchants to: collect card data once, tokenize it, place the "card on file" and then use the token later for another purchase by the same customer without requiring the customer to re-enter their card information again. In contrast, F-tokens can only be used to authorize a single transaction and are then marked invalid, preventing future re-use for another payment authorization. These tokens are static (i.e., each F-token has a one-to-one relationship with a given account number), global across space and time, do not expire, and have static attributes that ensures payment processors will reject recurring charges using the token.

Numerous other forms of tokenization service and token management systems are known to those of ordinary skill in the art. Generally, single-use tokens are faster to provision than tokens generated for repeat uses.

SUMMARY

Improved methods and systems for the utilization and management of tokens in a payment system are provided herein. Some of these methods and systems allow for enhanced omni-channel payments experiences and analytics. Some of these methods and systems allow for the generation and use of token maps that enable enhanced payment experiences at defined related locations within a single channel or across multiple channels. These methods can enable analysis and actions based upon customer spending actions or patterns across multiple channels (e.g., physical retail, card-not-present, online, mail order, phone order, and others). The methods and systems disclosed herein include token translation services, specific approaches for securing the token maps and associated data, and the efficient storage of the token maps and associated data to facilitate the enhanced payments experiences and analytics.

POS systems and their associated payment platforms will often need to deal with tokens of different types generated by the same or different tokenization services. The unique characteristics of the token types can render disambiguating useful data from a record of transactions on the payment platform difficult. However, using the approaches disclosed herein, token maps with this useful data can be efficiently and securely generated to facilitate near real time analysis of this data on the POS terminal side of a payment platform. For example, analytics can be conducted to efficiently aggregate and/or analyze transactions across merchant, location, originating device or customer-based dimensions. The analytics can identify and group transaction volume and value across different locations or channels. In certain implementations, the token map can serve as the basis for a customer data model (CDM) linking a customer to any number of transactions across all channels operated by a given merchant. Using some of the approaches disclosed herein useful data can be analyzed by a merchant utilizing their POS terminal or a portal provided by the administrator of a POS network. Such analysis would not require access to data held by a backend payment processing system. Instead, the required data would be stored on the POS terminal or on a private server operated by the administrator of the POS network. The useful data can include a transaction histogram for a specific customer across a merchant hierarchy including multiple channels. The useful data can also include a geographical spread of a customer's transactions over time. The useful data can also include the identification of many metrics of business interest including but not limited to data like a merchant's most valuable customers (MVCs).

POS system experiences can be enhanced using the approaches disclosed herein in numerous ways. For example, a user that has first interacted with a given merchant at a physical retail location can have their online account automatically linked to their store account as soon as they enter their account number via an online portal. The merchant can then seamlessly blend loyalty program and promotional consumer relationships across all its channels (in this example: physical retail store and online) without the need to have a customer use a specific store-branded payment method or additional specific store-branded loyalty program. Likewise, if a user first interacted with a merchant via an online portal, the first time they make a transaction at a physical retail location a cashier need not obtain their personal and store account information a second time as it will already be available at the point of sale terminal. Furthermore, as the token map can provide data concerning the behavior of individual users or groups of users, that same data can be used for fraud detection or to restrict use of a payment account from use at a specific merchant outside of a set geographical area or other rule-based limitation.

One aspect expressed by some of the methods and systems disclosed herein is a token translation service that operates on the POS terminal side of a payment system. The token translation service can be utilized to translate tokens for a given transaction into a canonical format. The canonical token format can then be used to facilitate the kinds of enhanced payment experience and analytics approaches mentioned above. In certain approaches, the token translation service will involve providing a single account number to two different tokenization services offered by one or more token service providers. One of these tokens can be used to process a payment transaction while the other token is stored on a POS terminal for later use. The tokens can be stored in encrypted form.

The tokens can be encrypted using a process known as salting in which additional data is added to a segment of data before it is encrypted. Increasing the size of the segment of data makes it easier to encrypt because decryption is directly linked to the size of the data to be decrypted, and an attacker will be unable to only focus on decrypting the payload of the encryption as opposed to the useless salt because before the data is decrypted there is no way to tell the difference between the useful part of the data and the salt. In certain approaches disclosed herein, the salt can be meaningful data associated with the token. For example, the salt could be the information needed for the CDE mentioned above (e.g., a store identifier at which a given transaction took place, a merchant identifier for the merchant that operated the store, and a description of the channel the transaction was handled on). In certain approaches, the token can be generated using a format preserving algorithm (FPA). The FPA can allow someone with knowledge of the encryption process to obtain the values of the data salt without decrypting the whole encrypted token. In one class of approaches, the values can be read directly from an inspection of the salted encrypted token. In another class of approaches, the values for the desired piece of data can be excised from the encrypted token due to the FPA although they will still need to be decrypted. In this last class of approaches, the FPA is beneficial because only a portion of the salted encrypted token needs to be decrypted which serves to conserve processing resources.

A disclosed method comprises transmitting a tokenization request with an encrypted payment account number from a point of sale device to a tokenization service and receiving a token from the tokenization service in response to the tokenization request. The token is a tokenized version of the encrypted payment account number. The method also comprises salting the token with data to produce a salted token, encrypting the salted token using a secure processor on the point of sale device, and mapping the encrypted salted token to the payment account number in a map. The payment account number is mapped using at least a portion of the payment account number; and storing the map and the encrypted salted token in a memory on the secure processor on the point of sale device.

Another disclosed method comprises receiving payment information via a first payment channel. The first payment channel includes a point of sale terminal, encrypting the payment information at the point of sale terminal, transmitting the payment information from the point of sale terminal to a first tokenization service through a network, receiving a first token at the point of sale terminal from the tokenization service, transmitting a payment authorization request with the first token to a payment processor, receiving an approval for the payment authorization request from the payment processor, transmitting the payment information from the point of sale terminal to a second tokenization service through the network, receiving a second token at the point of sale terminal from the tokenization service, and encrypting the second token to generate an encrypted token. The transmitting of the second tokenization request and the first tokenization request are both conducted by the point of sale terminal in response to the single step of receiving the payment account number at the point of sale device.

Another disclosed method comprises receiving payment information via a first payment channel. The first payment channel includes a point of sale terminal. The method also comprises encrypting the payment information at the point of sale terminal, transmitting the payment information from the point of sale terminal to a first tokenization service through a network, receiving a first token at the point of sale terminal from the tokenization service, transmitting a payment authorization request with the first token to a payment processor, receiving an approval for the payment authorization request from the payment processor, transmitting the payment information from the point of sale terminal to a second tokenization service through the network, receiving a second token at the point of sale terminal from the tokenization service, encrypting the second token to generate an encrypted token, and storing the encrypted token in association with a customer identifier. The transmitting of the second tokenization request and the first tokenization request are both conducted by the point of sale terminal in response to the single step of receiving the payment account number at the point of sale device.

BRIEF DESCRIPTION OF THE DRAWINGS

FIG. 5 includes an illustration of a POS network hierarchy and an ontological representation of a token map and salted encrypted tokens in accordance with some of the approaches disclosed herein.

DETAILED DESCRIPTION

Figure 1:
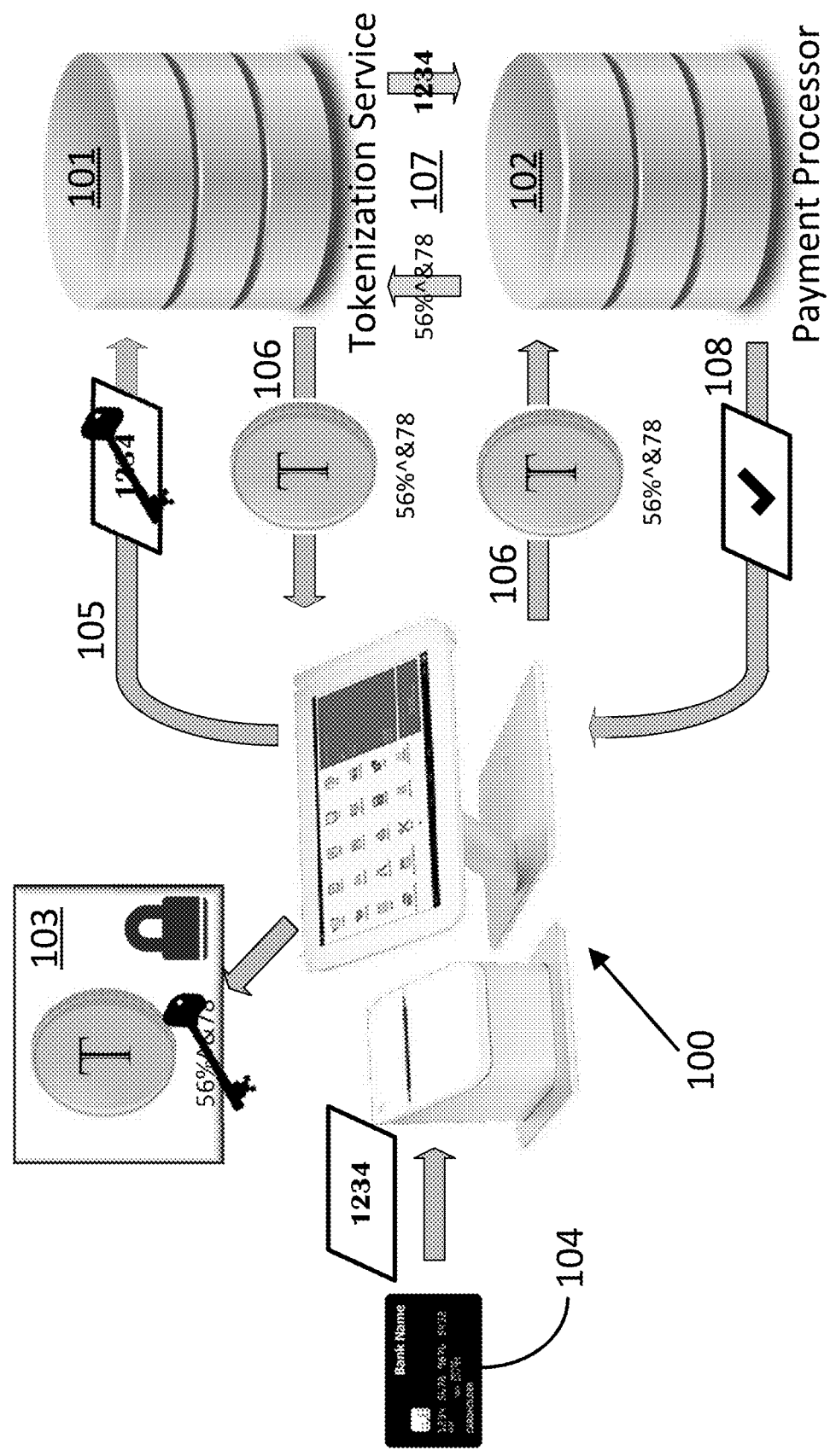
FIG. 1 includes a block diagram of a payment processing system including a point of sale (POS) terminal communicating with a tokenization service server and a payment authorization server.

Methods and systems for the use and management of tokens in a payment system are provided in this section as nonlimiting examples of specific embodiments of the disclosed invention. The methods and systems disclosed include specific embodiments of token translation services, specific approaches for creating and securing token maps, and specific approaches for the efficient use and storage of associated map data to facilitate enhanced payments experiences and analytics. In specific embodiments, the token maps include information collected from a plurality of different POS devices regarding transactions conducted via multiple channels (e.g., physical retail, card-not-present, online, mail order, phone order, and others). In this sense, the term POS device includes stand-alone POS terminals such as the hardware terminals found in brick and mortar retail establishments, smartphones connected to specialized POS card readers, and virtual POS devices instantiated using a private server and web browser. In specific embodiments, token maps form an industrial strength CDM that can be used to conduct analytics on transactions conducted by different customers using any of the different channels mentioned above. In specific embodiments, enhanced analytics are provided on the terminal-side of the payment system, which means merchants or POS network administrators can conduct and guide the analytics as opposed to payment processors on the server-side of a payment processing system.

Specific methods disclosed herein can be facilitated using a token management system. The token management system can be developed and administrated by a manufacturer of POS terminals or some other third-party entity separate from the merchants and consumers that take part in a transaction on a particular POS device. More generally, the token management system can be administrated and or used by a POS network administrator. The token management system can involve a network of POS devices. The token management system can be partially or fully instantiated on a POS device itself, or a collection of POS devices in communication with each other over a network. The token management system can be partially instantiated on a private server that acts to administrate the network of POS devices. The administrative tasks conducted by this POS network can involve tasks such as provisioning a device with secure keys to process transactions, monitoring the POS device for signs of breach, pushing updates to the software of the POS device, and other general administrative tasks. The POS networks mentioned herein are therefore separate from the payment processing networks that POS devices utilize to process and seek approval for specific transactions.

The token management system can generate token maps which link a stored token with data. The data can include restricted data and unrestricted data. Restricted data is sensitive data that must be treated differently than unrestricted data because of certain legal requirements such as those associated with consumer privacy protection or payment processing standards. For example, restricted data could include a customer's name or full payment card number while unrestricted data could include a store name. Restricted data can include a subset of the numbers in a payment account number and a name for a customer. The subset of numbers can be referred to as an abstract of the account number. Unrestricted data can include an identification of the location, merchant, and channel associated with a transaction.

A stored token can act as a unique identifier for a user. The stored token can serve as the basis for a token map and can be associated with restricted and unrestricted data. The data associated with the token map can be referred to as map data. While tokenization services vary, tokens share common characteristics in that they are generally long strings of random characters. For example, common tokenization systems are capable of issuing tokens with greater than 26 trillion potential values. As a result, a token is more likely to uniquely identify a user than an abstract of an account number or even a person's name. Furthermore, tokens can serve as a pre-secured hook into a CDM because the token has already necessarily been sent through an encryption system as part of the tokenization process. As compared to other data which would necessarily need to be encrypted first, the token can be read by an external API as soon as it is received. To increase the security of the system, stored tokens could be encrypted before they are used to allow for enhanced functionality and analytics on the POS network, but even in these approaches, the tokenization of the underlying information still provides a level of security which makes them a good choice for the core of a CDM.

In certain approaches, token management can involve the use of a token translation service that serves to associate map data with a canonical token. The token translation service can be a part of the token management system. The association of the data with the canonical token can then serve as the basis for the token maps and CDMs disclosed herein. As different payment channels for a single merchant may be configured to authorize payments using different types of tokens, the selection of a canonical token is beneficial because the different tokens would otherwise limit correlating the various associated transactions via a comparison of the tokens. The association between data and the canonical token can be formed in the memory of a POS device such as in a secure hardware element on the POS device or on a private server of a virtual POS device. The data can then be transmitted to a secure server for storage with the token maps as will be described below.

The action of the token translation service can be conducted asynchronously with the payment processing on the POS devices such that payment processing latency is not impacted by the token translation. The action of the token translation service can be conducted internally to a POS network. As mentioned previously, a POS network spanning multiple merchants can be administrated by the designer and manufacturer of the POS devices on behalf of those merchants. The action of the token translation service can be conducted at either the merchant or broader POS network administrator level. The token translation service will need to send tokenization service requests outside of the network, but the decisions to send those requests and management of the received data can all be conducted internally to the POS network.

The token translation service can take on numerous forms. The token translation service can include a token translation service client, a token caching service, and at least one network connection to an external tokenization service. The tokenization service can be the external or third-party tokenization service described with reference to FIG. 1. The token translation service client can be installed on the POS device, instantiated as a module in a virtual POS or in the memory of a POS terminal. The token translation service can be programmed to check the token caching service to see if a canonical token is stored for a given user or payment card, and request a canonical token if the token caching service responds negatively.

The token caching service can be a distributed cache service involving a network of POS terminals and an optional central server. The central server can be provided by the administrator of the POS network. The token caching service can be used to store a set of canonical tokens. The token caching service can also either store, or have access to, the token maps described herein. The token caching service can work in combination with the token translation service client to see if a canonical token exists for a given payment account, and can request a canonical token from a specific tokenization service if that canonical token does not exist. As the token translation service client will need to access the payment account, the token translation service client can be instantiated by the same hardware that is used to encrypt a payment account on the POS device and send the encrypted payment account off for authorization.

As mentioned previously, the token translation service client can work asynchronously from the payment authorization flow. Therefore, even if the token translation service client was implemented on the same hardware as used for payment authorizations, the payment processing latency of the POS terminal would not be affected. For example, the token translation service could wait until a payment authorization had been received from a user before querying the token caching service to see if the canonical token was already stored. This approach would require the POS device to store the account number beyond receipt of authorization, but only for a short period of time. If a given payment processing standard did not allow such post-authorization storage, the token translation service client could be designed to query the token caching service immediately after the encrypted payment account was sent for authorization, but before authorization was received. The token translation service client could also be designed to query the token caching service before the encrypted payment account was sent for authorization, create a new token and then use that token to request a payment authorization.

The canonical token can take on various forms. The canonical token will be a token received from a network-agreed upon tokenization service that will serve as the provisioning service for the canonical tokens. The canonical token does not need to be used to authorize a payment, instead it can be used as an identifier to fill one entry in the token maps disclosed herein and serve as a hook for attaching additional data to a CDM. The canonical token can serve as a proxy for a customer identifier such as a legal name of a customer which could otherwise be restricted data. Therefore, analytics conducted on a token map could roll-up transactions on a customer dimension in an anonymized manner.

The canonical token can be any token offered by a tokenization service that does not have overly restrictive limits on the duration for which the token can be stored. Indeed, in some of the approaches in accordance with this disclosure, the intended characteristics and functionality of the canonical token by the tokenization service are not relevant to the use of the canonical token by the token management system. In these approaches, even if the token has a limited period of validity in which it can be used to authorize payments, the token can be used as the basis for the token maps disclosed herein even after that period of validity has elapsed. Certain benefits accrue to approaches in which the canonical token is used for both authorizing a payment and as the basis for the token map because this would reduce the number of tokenization calls required overall. However, once a canonical token is selected, this option will not be available for all payment channels because those payment channels may be configured to use tokens of a different kind. For this reason, in some approaches, the canonical token is selected by a merchant to match the tokens type most often used by its customers.

Figure 2:
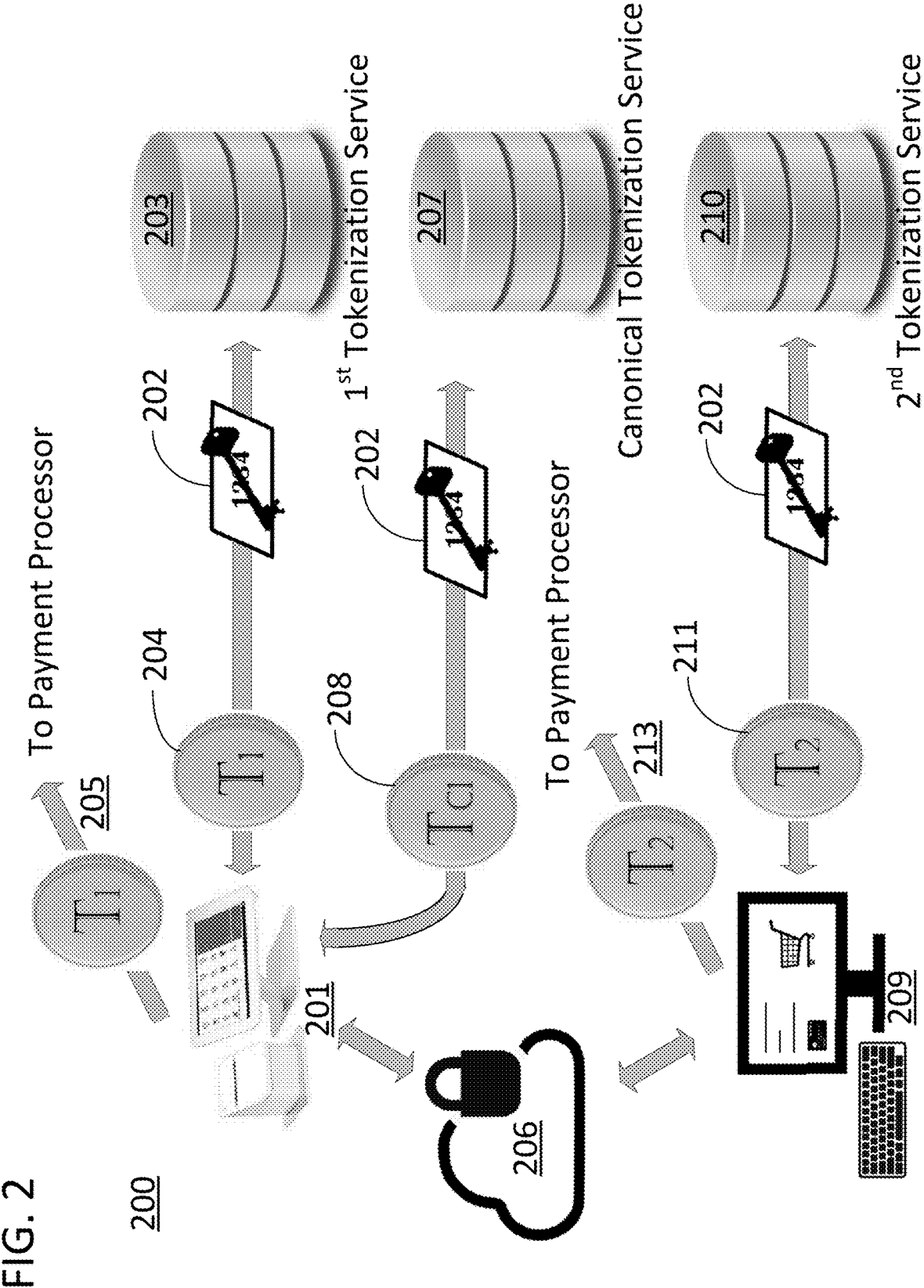
FIG. 2 includes a block diagram and overlying flow chart of a tokenization translation service in accordance with certain approaches disclosed herein.

FIG. 2 includes a block diagram and overlying flow chart for a set of methods and systems in accordance with some of the token translation services disclosed herein. Block diagram 200 includes POS terminal 201 which could include a tokenization service client running on a secure hardware element. Upon receipt of payment information, such as an account number, POS terminal 201 could encrypt the payment information using the secure hardware element and transfer the encrypted payment information 202 to a first tokenization service 203. The first tokenization service could be on an external server accessible via a network connection. The first tokenization service could provide a first token T1 204 in return for the encrypted payment information 202. The first token T1 could be, for example, an F-token valid for authorizing a single transaction. Upon receipt of token 204, POS terminal 201 could then send the token to a payment processor via an authorization request 205.

The token translation service can involve a token translation client operating on POS terminal 201 checking to see if a token caching service has already stored a canonical token corresponding to the user or payment account involved with authorization request 205. In one approach, the tokenization caching service is a distributed cache, and the queries can be conducted locally on POS terminal 201 using only the secure element on POS terminal 201. An abstract of the payment account number such as the first six and/or last four digits of the account number could be used for this purpose. In other approaches, such as the one illustrated in FIG. 2, the process will involve a query to a secure server 206. The query could involve an abstract of the payment account number. The query could alternatively or in combination include the name of the account holder or other data elements. The query to the secure server could be encrypted if it included restricted data. The tokenization caching service will return a response indicating whether a canonical token has been stored in association with the user or account number. If a canonical token has been stored, no additional translation services are required and the token translation service client can pass control off to alternative systems responsible for maintaining, securing, and adding to the token map. In this case, additional information associated with authorization request 205 such as an identity of the merchant, the time of the transaction, the channel used for the payment authorization, the kind of goods or services sold, etc. can be stored as data in association with the canonical token in the token map. If a canonical token has not yet been stored, the tokenization translation service client can obtain a canonical token.

A canonical token can be obtained by asynchronously resending the encrypted payment account to a canonical tokenization service 207. The encrypted payment account number could be sent to canonical tokenization service 207 immediately after sending authorization request 205. Alternatively, the encrypted payment account number could be sent to the canonical tokenization service 207 after the approval had been returned from the payment processor. The canonical tokenization service 207 could then return canonical token TC1 208. The canonical tokenization service could alternatively be the same as the first tokenization service. In that situation, when the tokenization caching service determined that a canonical token was not yet stored, token T1 could be stored immediately as the canonical token. The tokenization translation client could be programmed to identify canonical token formats such that a check to the token caching service was not required upon a determination that the received token was a canonical token. However, in the illustrated case, the canonical token and the first token are not the same kind of token. The canonical tokenization service could be provided by an entirely separate entity than the service that provided the first token. However, the canonical tokenization service could also just be a different tokenization service offered by the same entity. In one example, the canonical token will be a multi-pay (MP) token while the first token is an F-token, both of which were provided by the same overarching entity.

Upon receipt of canonical token 208, the token translation service client could request the token management system to store the canonical token 208 along with data from the transaction such as an abstract of the account number, details regarding the transaction, a name of the account holder, and other information. After being stored, the canonical token would be recognized by later queries from the token translation client. The queries could be received from any POS device on the POS network. Since the POS administration network is custom designed and has less stringent requirements than a payment authorization network, the queries can be passed from POS devices of different channels such as a virtual POS or physical POS terminal. As illustrated, payment information 202 could be received, after the storage of the canonical token, at a virtual POS 209 operating on a separate channel. The separate channel could involve the use of a second tokenization service 210 used for card-not-present ecommerce transactions. A second token 211 could thereby be returned from second tokenization service 210 to virtual POS 209. Virtual POS 209 would then transmit token T2 to a payment processor in a second payment authorization request 213.

In situations where a canonical token had already been provisioned by the token translation service, additional queries by the token translation service client would not result in another request for a canonical token. In the example of FIG. 2, virtual POS terminal 209 could also include a tokenization translation service client which would asynchronously query the token caching service 206 to determine if a canonical token associated with the user or account number was already stored in the cache. In this case, since the payment account information 202 had previously been translated to canonical token 208, this second query to the token caching service would return a message to the token translation service client that there was no need to translate the token. As a result, the token translation service client on virtual POS 209 would transfer control to another system responsible for adding data regarding the instant transaction to the token map without the need for additional interruption. In other approaches, the query for stored information associated with encrypted payment information 202 could be conducted immediately after sending the tokenization service request to second tokenization service 210. If the query determined that a token with multiple payment authorizations was found, the canonical token could immediately be used to authorize the transaction by being included in the second payment authorization request 213. In the illustrated case, this would involve token T1 substituting for token T2 in payment authorization request 213.

Figure 3:
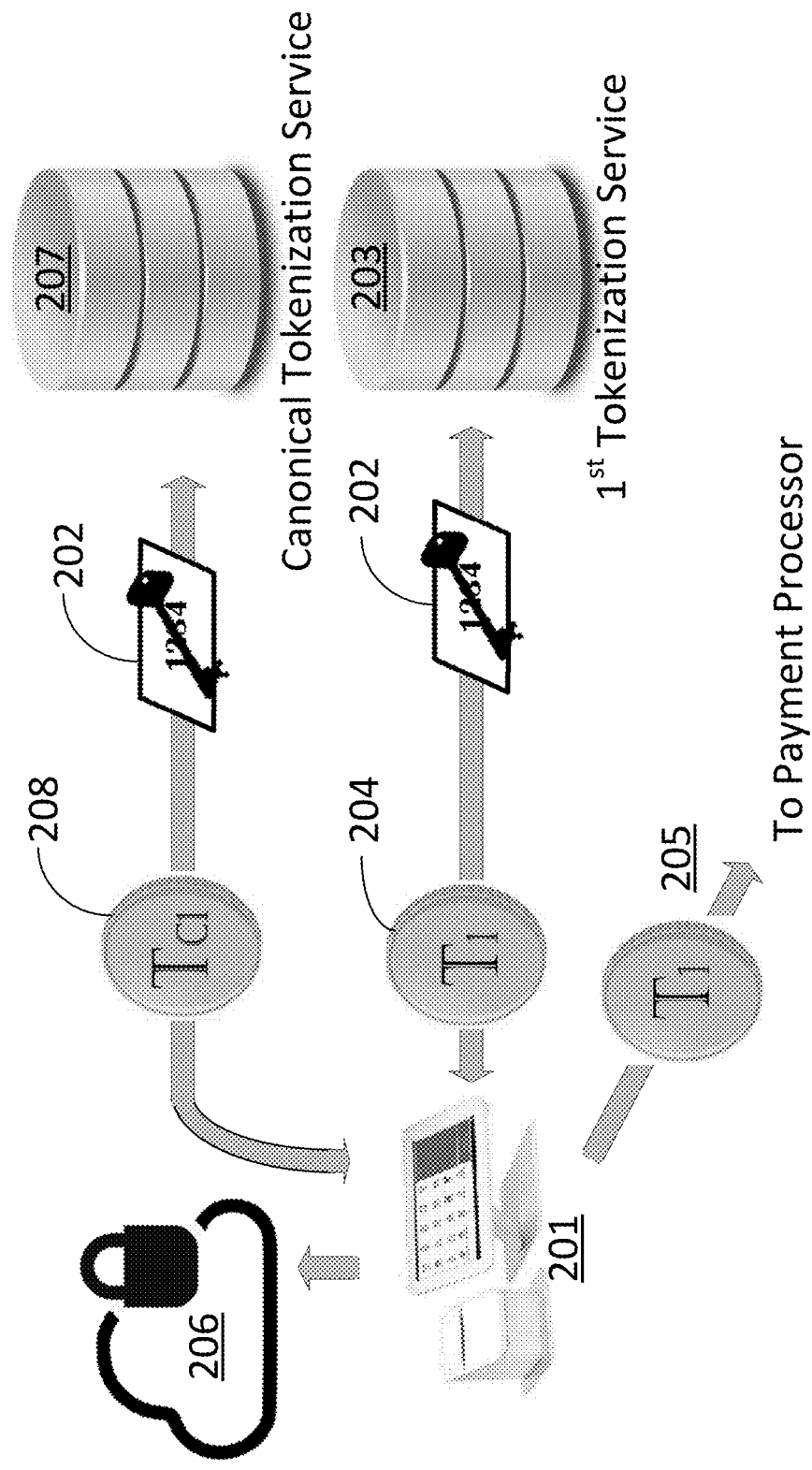
FIG. 3 includes a block diagram and overlying flow chart of a tokenization translation service in accordance with certain approaches disclosed herein where a canonical token is requested using encrypted payment information before the payment information is used to process a payment.

The approaches described with reference to FIG. 2 can be augmented slightly to involve an asynchronous call to the canonical tokenization service that precedes the call to the tokenization service for purposes of processing a payment. FIG. 3 includes a block diagram 300 and overlying flow chart for a set of methods and systems in accordance with some of the token translation services disclosed herein where the call to the canonical translation service occurs prior to any external call from the POS system for purposes of processing a payment. Block diagram 300 differs from the diagram in FIG. 2 in that the steps are drawn in chronological order with the steps flowing chronologically in a clockwise direction around POS terminal 201. As seen, the token caching service can be pinged before payment information is encrypted and sent to the tokenization service associated with the payment. Assuming the token caching service returns an indication that a canonical token has not been stored, the step of requesting the canonical token can also be conducted before the POS terminal takes steps to further process the payment.

The tokens can be stored in association with other information for later use (e.g., business purposes, building a CDM, or restricting transactions). As explained above, the tokens can be received across different payment channels. The tokens can be stored in a map. The map could be a map between a token, an abstract of the account number (e.g., first 6 and last 4 digits of a credit card), and other restricted or unrestricted information. The token maps could be synchronized across multiple POS devices and/or a central private server. Some of the information can remain unencrypted even if the tokens are encrypted.

The tokenization translation service could operate with varying levels of frequency and immediacy relative to the intake of personal account numbers. As described with reference to FIG. 2, the translation could occur in real time with the receipt of account numbers and the payment authorization flow in which those account numbers were being used. The translation service could be conducted in synchronization with the payment authorization flow or separately in an asynchronous approach. The translation service could also be conducted on demand by an administrator of the POS network that accepted the personal account number or by the merchant. For example, the merchant could have the option to activate and deactivate the token translation service at will in order to collect data at specific times, in specific locations, or on specific channels.

While the payment industry generally finds the storage of tokens by POS terminals to be more acceptable than the storage of personal account numbers, in the modern environment of data breaches and network vulnerabilities, extreme care must be taken in the storage of any customer data. Furthermore, tokens are susceptible to "rainbow table attacks" because of the limited state space in a personal account number. Using this type of approach, an attacker could conceivably reconstruct an account number if given enough tokens by finding the only algorithm that could have produced those various tokens from a single account number of limited size.

Specific embodiments disclosed herein include numerous methods for securing the tokens, token maps, and the underlying map data. Strong cryptographic principles and protocols such as least privilege, bounded context, cryptographic hashing and salting, and the use of secure elements for handling the associated data could be applied. The tokens could be encrypted and stored using a secure element on the POS device. For example, in the case of a POS terminal, the token could be encrypted using a hardware security module (HSM). As another example, the token could be encrypted and stored on a private server or within a transparent data exchange (TDE) enabled database or equivalent. The cryptographic approach used to encrypt the token could use a strong salted hash of the token with salt pulled from a secure location. For example, the salt could be a random number generated on the HSM of a POS terminal. The HSM could be the same secure processor used to encrypt the payment account. The tokens could also be sharded and stored across multiple HSMs. In approaches utilizing a distributed cache, the distributed cache administrator could assure that no single POS terminal stored enough data to reconstruct a single token. Furthermore, if analytics were offered to allow data analysis of the token maps and underlying map data via an API, the API could be rated as a sensitive and secure API to prevent any attacks. The associated security features could include rate limiting the API, authenticated caller end-point controls, response obfuscation, and other techniques. Restricted and unrestricted map data could also be treated using different levels of security in exchange for increasing or decreasing the efficiency of the overall token management system.

Figure 4:
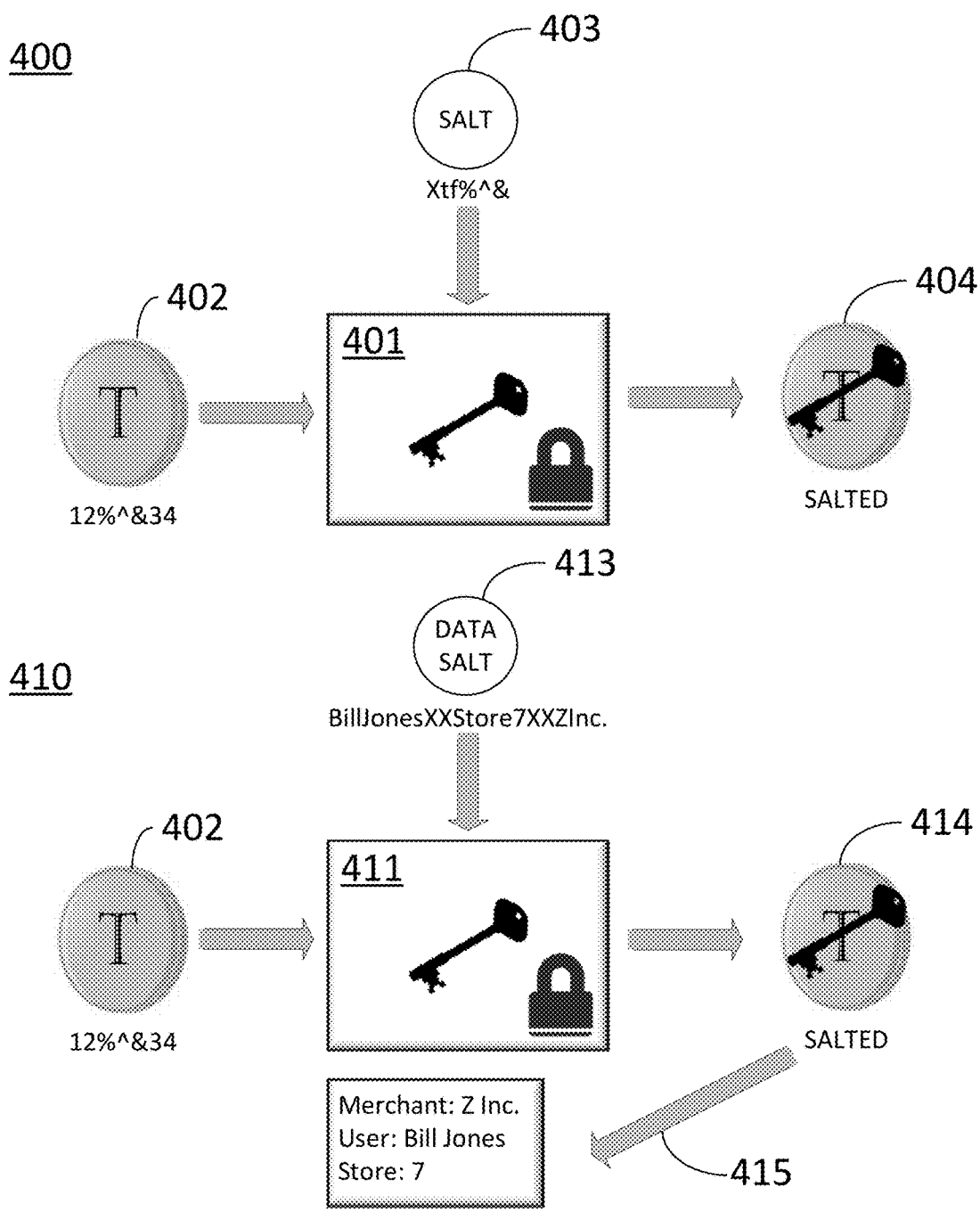
FIG. 4 includes two block diagrams and overlying flow charts for the encryption of a salted token in accordance with certain approaches disclosed herein.

FIG. 4 provides two block diagrams 400 and 410 that illustrate approaches for encrypting the stored tokens in accordance with this disclosure. Both diagrams include an encryption engine (401, 411) used to encrypt a token and its associated salt. In both approaches, the encryption engine is instantiated by an HSM on a physical POS terminal. However, any secure element or private server could be used to instantiate the encryption engine.

In block diagram 400 a first token 402 is salted using salt 403. Both first token 402 and salt 403 are represented by a string of characters. Salt 403 can be a random string of characters generated by a random character generator on the same HSM that instantiates encryption engine 401. The salted token is encrypted in block 401 to produce encrypted salted token 404. The encryption conducted by block 401 can include the use of cryptographic keys and any kind of cryptographic algorithm including 128-bit, 192-bit and 256-bit AES, RSA, SQUARE, CRYPTON, ARIA, Camellia, Data Encryption Standard (DES), Triple Data Encryption Standard/Algorithm (TDES/TDEA), Blowfish, Serpent, Twofish, Threefish, Secure and Fast Encryption Routine (SAFER), International Data Encryption Algorithm (IDEA), Tiny Encryption Algorithm (TEA), extended TEA (XTEA), and others. The salt can be any length of characters sufficient to increase the size of the personal account number to a length that makes it less susceptible to rainbow table attacks while at the same time not overly increasing the processing resources required for encryption engine 401 to encrypt the salted token.

In block diagram 410, the first token 402 is salted using data salt 413. Rather than being a random number, data salt 413 will include meaningful business context data such as a customer universal unique identifier, merchant universal unique identifier, transaction details, and other information. Indeed, any of the restricted or unrestricted map data that is associated with a given token could be used as data salt to increase the performance of the encryption of the token. This data can then be available whenever the token is decrypted for purposes of reading data from the token map. Certain benefits accrue to approaches in which only the unrestricted map data is used to encrypt the tokens as the tokens may need to be exposed outside of a secure environment for analytics and/or increasing the functionality of the overall POS network.

Block 411 can conduct an industrial strength format-preserving encryption (FPE) algorithm. Using this approach, encrypted salted tokens could be read to aggregate them within a given business context without even decrypting the token. For example, a direct analysis 415 via a secure system with knowledge of the FPE algorithm could be conducted on encrypted salted token 414 to reveal that the salted token was associated with a specific user "Bill Jones" a specific merchant "Z Inc." and possibly a specific location. Each bit of information could be hashed separately, but appended to build a format preserving encrypted string (e.g., the first six characters of the string could encode a token, the next three characters could encode a merchant identifier, etc.). As a result, an API call requesting a roll-up of all transactions conducted on a POS network on channels owned by Z Inc. could be responded to without decrypting any of the tokens. In other words, the tokens would not need to be decrypted at any point between when the request was received via the API and the response was delivered back to the API. This approach could provide large efficiency gains in that the encrypted tokens would otherwise need to be decrypted in order for the token map to be efficiently searched. In these approaches, implementing block 411 and the storage area for the tokens on a private server may be a more secure and beneficial approach because FPE algorithms are more prone to expose the underlying data. Furthermore, in specific approaches, the data salt will only include unrestricted data, so that information such as a customer's name (e.g., "Bill Jones") is not accessible via an analysis of the salted encrypted token.

A class of approaches disclosed herein can be referred to as those in which the tokens are "decorated" with useful data. The example of block diagram 410 is one of these approaches. The tokens could be decorated using an FPE algorithm as described above. Alternatively, the tokens could be decorated by an overlay data model that both uniquely identifies and maps each relevant token to a merchant's business hierarchy or other data space. For example, a token could be decorated to associate the token with a merchant identifier, a sales channel identifier, a franchise identifier, and other information. The data overlay could be accessible by a secure API.

Approaches in which the tokens were decorated would allow for one shot analytics where transaction rollups across different dimensions (e.g., customer, merchant, franchise, channel) could be simply calculated or grouped by running the same code that grouped the transactions with the canonical token. In FPE decoration approaches the semantic structure of the token could be utilized to produce even greater efficiency gains. In these approaches, one shot queries would simultaneously break down transaction aggregates into groups along the dimensions mentioned above without extraneous data. Furthermore, since the tokens are used as external proxies for restricted customer identifiers, such roll-ups along a customer dimension would be anonymized and not run counter to consumer privacy restrictions.

The decorations applied to the tokens could have additional data besides map data. The data could also be used to facilitate advanced features from the POS system such as enhanced fraud monitoring, increased convenience, or enhanced loyalty programs. For example, merchants could select to collect a "card on file" from customers and set the token decorations to reflect values that imply a validity of the token within their entire POS network, or a subset, based on whatever the customer or merchant decided at the time the token was decorated. Depending on the token decorations, that token could then be shared among the POS network locations of that merchant and be used at any of those locations where it was made valid. The token data could thereby also serve to enhance the security of the system because it would act as an additional level of authorization. Furthermore, if the data that restricted use of the token was accessible via direct analysis of an FPE salted encrypted token, failure at the first authorization level would prevent the needless exposure of the token through decryption for a transaction that was already denied.

FIG. 5 provides an illustration of a POS network hierarchy 510 alongside an ontological representation 500 of a token map in accordance with some of the approaches disclosed herein. The dotted lines in the representation 500 illustrate cryptographic or other secure barriers that prevent the illicit derivation of data in the opposite directions of the arrow heads in the schema. In the case of barriers 501 and 502, the barrier is that provided by a tokenization service that isolates a payment account number (PAN) from Token A and Token B. The barrier is therefore highly secure. In some embodiments it is mathematically impossible to derive information back through these barriers. Barrier 503 is provided by the token management system and can include limited privileges, secure hardware elements, and the encryption algorithms used to generate the encrypted tokens on the POS devices. In one example, barrier 503 is provided by an FPE encryption algorithm (FPm) which encrypts a token that may be salted with unrestricted data prior to encryption.

In representation 500, Token A is a canonical token that was retrieved after Token B was utilized to authorize a payment for the customer. However, both Token A and Token B were used to generate encrypted tokens and the relationship between the tokens is preserved as part of the token map. As illustrated, Token B is encrypted using a different encryption algorithm and is not salted with data prior to encryption. However, a portion of unrestricted data could have been used to salt Token B prior to an FPE encryption such that the two salted encrypted tokens could be correlated via a direct analysis of the encrypted salted tokens. The encrypted tokens could also be linked via the addition of a data overlay applied on the less secure side of barrier 503 from information provided separately across barrier 503.

Network hierarchy 510 is provided to show an example of how the token management system can facilitate the efficient roll-up of transactions across merchant, franchise, or channel dimensions for purposes of conducting analytics, and the efficient enhancement of functionality offered by the POS network. Network hierarchy 510 includes a customer level, a merchant level, a merchant franchise level, and a sales channel. As illustrated, customer A has been a customer of both Merchant A and Merchant B. Blocks in the network hierarchy that are annotated with three characters illustrate how tokens can be decorated with data to facilitate transaction roll-up. Sales channel FFF may correspond to a bank partner to a POS terminal manufacturer where different franchises obtain their position in the POS network via their relationship to the bank partner. Under channel FFF are a physical franchise headquarters 345 with two physical franchise locations 222 and 223. In this example, a card payment is taken at location 222 and the card PAN of customer A is tokenized as: XYZABC. When the token is encrypted it is decorated with additional elements 222 (store location where PAN was captured), 345 (franchise to which the store location belongs) and FFF (banking partner sales channel). The decorated token then appears as XYZABC222345FFF. In this example, the token is decorated using data salt and is encrypted using an FPE.

Increased functionality can be provided by allowing POS device operators to restrict or allow transactions based on the decorations of a given token. As an example of increased functionality, Franchise A could decide they will enable sharing tokens to enable Customer A to use their "card on file" at all physical franchise locations. This customer could go to physical location 223 and make a payment using their card on file since validation in this example would be made at the Franchise A level (345), and any sub-location value (222 or 223) is considered valid. As such, Customer A might not have to provide their account number again when moving to make a purchase at Merchant B. Instead, any token decorated with 345 would be automatically accepted for processing transactions. As another example, the Franchise A could decide that they do not want to allow sharing of tokens from the physical world with their online commerce site. In this situation, if the token XYZABC222345FFF is attempted at the Franchise 345 online commerce site (which uses a token ID value of GGG for the Online channel), then this token XYZABC222345FFF would be invalid (and rejected) even though the merchant and franchise values may have matched. The POS network administrator could give any party in the POS network the ability to set these rules. As another example, if instead Franchise A decided they do want to allow sharing of tokens from the physical world with their online commerce site, if the token XYZABC222345FFF is applied at Franchise A's online commerce site (which uses a token ID value of GGG for the online channel), then the token would be valid since the validation will be done on the token component for the Franchise level (i.e., 345).

Using the above approach, any token user can construct and deconstruct a rule set that will determine valid and invalid use parameters for any token generated in their network. This approach can be utilized at the merchant, POS network, customer, and channel levels depending upon the access afforded to the associated entities by the POS network operator. In situations where the token decorations allow for a transaction to take place, the token map can also be utilized to authorize the transaction without the need to transfer payment data at the time of authorization. In specific approaches, the token map includes a mapping to a canonical token such as a multi-pay token that can be used to authorize multiple transactions within a given merchant space. In these approaches, once the transaction has been determined to be authorized by an analysis of the token decorations, the token can be decrypted and used to authorize a transaction with a payment processor. In other approaches, the token decorations can be used to authorize a transaction at the POS network level and a stored single-use token will be utilized to authorize the transaction at the payment system level. In these approaches, the personal account number that was used to access the token map can then be used to replenish the token map with an additional single-use token using a variant of the token translation service described above. In this approach, it is the stored token that is used to authorize the transaction with a payment processor while the token obtained from a tokenization service using the account number is stored in the token map for later use.

While the specification has been described in detail with respect to specific embodiments of the invention, it will be appreciated that those skilled in the art, upon attaining an understanding of the foregoing, may readily conceive of alterations to, variations of, and equivalents to these embodiments. Any of the method steps discussed above can be conducted by a processor operating with a computer-readable non-transitory medium storing instructions for those method steps. The computer-readable medium may be a memory within a personal user device, a workstation, or a network accessible memory. These and other modifications and variations to the present invention may be practiced by those skilled in the art, without departing from the scope of the present invention, which is more particularly set forth in the appended claims.

What is claimed is:

1. A method comprising:
transmitting a tokenization request with an encrypted payment account number from a point of sale device to a tokenization service;
receiving a token from the tokenization service in response to the tokenization request, wherein the token is a tokenized version of the encrypted payment account number;
salting the token with data to produce a salted token;
encrypting the salted token using a secure processor on the point of sale device;
mapping the encrypted salted token to the payment account number in a map, wherein the payment account number is mapped using at least a portion of the payment account number; and
storing the map and the encrypted salted token in a memory on the secure processor on the point of sale device.

2. The method of claim 1, further comprising:
receiving a request to initiate a second payment using the account number on a second point of sale device;
identifying the encrypted salted token using the account number;
decrypting the encrypted salted token to retrieve the data; and
restricting the initiation of the second payment on the second point of sale device based on the data.

3. The method of claim 1, further comprising:
receiving a request to initiate a second payment using the account number on a second point of sale device;
identifying the encrypted salted token using the account number; and
restricting the initiation of the second payment on the second point of sale device: (i) without decrypting the encrypted salted token; and (ii) based on the data.

4. The method of claim 1, further comprising:
providing an application programming interface on the point of sale device for conducting analytics using the encrypted salted token;
receiving a request for data on the applications programming interface; and
providing a response on the applications programming interface;
wherein the response includes data from a field of the encrypted salted token; and
wherein providing the response does not involve decrypting, at any time between when the request is received on the application programming interface and when the response is provided on the applications programming interface, the encrypted salted token.

5. The method of claim 1, wherein:
the encrypting of the salted token is conducted using a format preserving encryption algorithm; and
the point of sale device is a point of sale terminal.

6. The method of claim 5, further comprising:
receiving a request to initiate a second payment using the account number on a second point of sale terminal;
identifying the encrypted salted token using the account number;
evaluating a field of the encrypted salted token without decrypting the encrypted salted token; and
restricting the initiation of the second payment on the second point of sale terminal based on the evaluating of the field of the encrypted second salted token.

7. The method of claim 5, further comprising:
providing an application programming interface on the point of sale terminal for conducting analytics using the encrypted salted token;
receiving a request for data on the applications programming interface; and
providing a response on the applications programming interface;
wherein the response includes data from a field of the encrypted salted token; and
wherein providing the response does not involve decrypting, at any time between when the request is received on the applications programming interface and when the response is provided on the applications programming interface, the encrypted salted token.

8. The method of claim 7, further comprising:
rate-limiting the application programming interface.

9. The method of claim 7, further comprising:
sharding the encrypted salted token into at least a first shard and a second shard;
transmitting the second shard to a second point of sale terminal for a partitioned storage of the encrypted salted token; and
wherein storing the encrypted salted token in the memory on the secure processor involves storing the first shard in the memory as part of the partitioned storage.

10. The method of claim 1, wherein the tokenization request is a first tokenization request and the point of sale device is a first point of sale device, further comprising:
receiving a payment account number at the point of sale device;
encrypting the payment account number on the point of sale device into the encrypted payment account number;
transmitting a second tokenization request with the encrypted payment account number to a second tokenization service;
receiving a second token from the tokenization service in response to the tokenization request, wherein the second token includes a second tokenized version of the encrypted payment account number;
transmitting a payment authorization request with the second token to a payment processor; and
receiving an approval for the payment authorization request from the payment processor;
wherein the transmitting of the second tokenization request and the first tokenization request are both conducted by the point of sale device in response to the single step of receiving the payment account number at the point of sale device.

11. The method of claim 10, wherein:
the transmitting of the second tokenization request and the first tokenization request are conducted asynchronously by the point of sale device.

12. The method of claim 10, further comprising:
receiving the payment account number on a second point of sale device;
wherein the first point of sale device is a point of sale terminal; and
wherein the second point of sale device includes a virtual point of sale instantiated on a server and a web browser.

13. The method of claim 12, further comprising:
retrieving the encrypted salted token using the map and the payment account number;
storing the encrypted salted token on the second point of sale device as a retrieved encrypted salted token;
transmitting a second payment authorization request from the second point of sale device using the retrieved encrypted salted token; and
receiving a second approval for the second payment authorization request.

14. The method of claim 12, wherein the payment authorization is a first payment authorization, further comprising:
transmitting a second payment authorization request from the second point of sale device;
receiving a second approval for the second payment authorization request; and
associating the first payment authorization and the second payment authorization in memory using the map.

15. The method of claim 14, further comprising:
providing an application programming interface on the point of sale device for conducting analytics using the map; and
obtaining data regarding the first payment authorization and the second payment authorization via a single call to the application programming interface.

* * * * *